Feb. 3, 1948.    J. H. COOPER    2,435,494
PLATEN DRIVE FOR FLASH-BUTT WELDERS
Filed Oct. 30, 1944    2 Sheets-Sheet 1

Inventor
JOSEPH H. COOPER
By Francis J. Klempay
Attorney

Inventor
JOSEPH H. COOPER
By Francis J. Klempay
Attorney

Patented Feb. 3, 1948

2,435,494

UNITED STATES PATENT OFFICE 2,435,494

PLATEN DRIVE FOR FLASH BUTT WELDERS

Joseph H. Cooper, Warren, Ohio, assignor to The Taylor-Winfield Corporation, Warren, Ohio, a corporation of Ohio Application October 30, 1944, Serial No. 560,961

10 Claims. (Cl. 219—4)

1

This invention relates to electric resistance flash-butt welders and more particularly to an improved and simplified arrangement for obtaining the required movements and character of movement of the slideable platen of such apparatus. As heretofore constructed, welding machines of this nature each comprises a base or frame on which is mounted a normally stationary platen to grip and conduct welding current to one of the work pieces to be welded and a slideable platen for gripping and conducting welding current to the other of the work pieces, the arrangement being such that the platens are movable toward each other in effecting a weld and away from each other preparatory to the next succeeding welding operation. In operation of such machines, the process which may include a pre-heating period comprises the application of current to the work pieces to initiate flashing therebetween after which the movable or slideable platen is moved forwardly in compensation of the metal burnt off to maintain optimum flashing conditions and at the end of the flashing period the movable platen is advanced rapidly to jam the work pieces together thereby upsetting the adjoining edges of the work pieces for completion of the weld.

During flashing action it is important that the movement of the slideable platen be smooth and uninterrupted while under precise control and heretofore such movement has been accomplished either manually, hydraulically, or by the use of a motor driven cam. The first of these methods is impractical in the case of large machines or in circumstances where experienced operators are not readily available and the hydraulic method requires the costly installation of fluid pumps, valves, etc. The motor driven cam, while providing a simple arrangement, is not amenable to the ready interchangement of movement patterns, to the ready manipulation of the slideable platen in setting-up and preheating, etc., and is not adaptable to the automatic control of the movement of the platen in response to the instantaneous condition of the flashing between the work pieces. Further, all the mechanical parts in such construction must necessarily be of sufficient strength to withstand the shock and forces encountered at the time of upset and consequently the mechanism is heavy and unwieldy.

2

It is accordingly the primary object of the invention to provide a simplified and improved means for obtaining precisely controllable manipulative and flashing movement of the slideable platen of a flash-butt welding machine while also providing means capable of delivering the heavy forces required for upsetting together with an arrangement for accurately synchronizing the application of the heavy upsetting forces. A more specific object of the invention is the provision of movement effecting means having the general characteristics herein described which is unitary in character and simple and inexpensive to produce.

A further object of the invention is the provision of a mechanical drive for the slideable platen of a flash-butt welding machine which is operative to effect either forward or reverse movement of the slideable platen either under manual or automatic control and at any stage of the manipulative or flashing periods. A further object of the invention is the provision of a driving mechanism for such slideable platen which is amenable to widely varying methods of control as dictated by the particular requirements of the production set-up in which the welding machine is utilized. Thus, it has been heretofore proposed to control the movement of the platen either manually, in accordance with a time-position pattern templated on a suitable time-controlled cam, or in accordance with one or more instantaneous electrical conditions in the welding circuit and the present invention enables any of these methods to be employed with essentially the same mechanical apparatus.

Still further objects of the invention include the provision in a mechanical drive for the slideable platen of a flash-butt welder, of an inherent and simplified arrangement for increasing the accuracy and sensitivity of the connected controls, and of an arrangement whereby an increased rate of upset movement may be attained. The last mentioned advantage is brought about, primarily, by reducing to a minimum the inertia of the parts actually employed in effecting the upsetting movement. Further, the invention provides an arrangement for readily controlling the rate of movement of the platen during upset.

The above and other objects and advantages of the invention will become apparent upon consideration of the following detailed specification and the accompanying drawing wherein there is disclosed a preferred embodiment of the invention.

Figure 1:
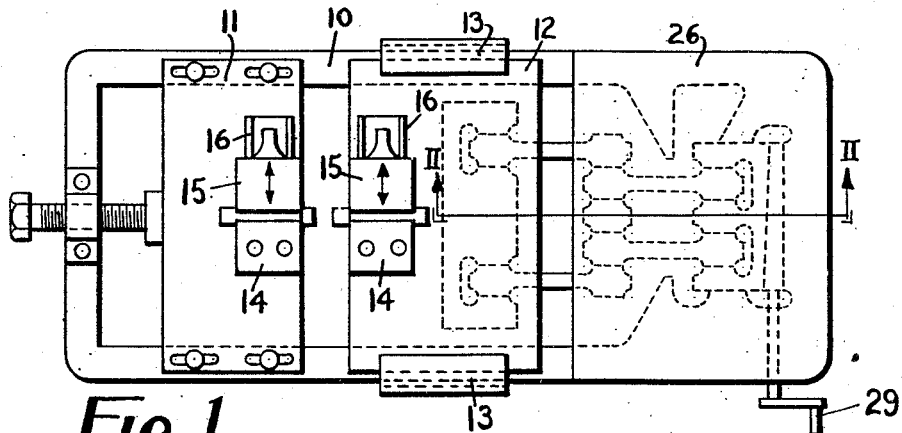
Figure 1 is a plan view of an electric resistance flash-butt welding machine constructed in accordance with the principles of the invention.
Figure 2:
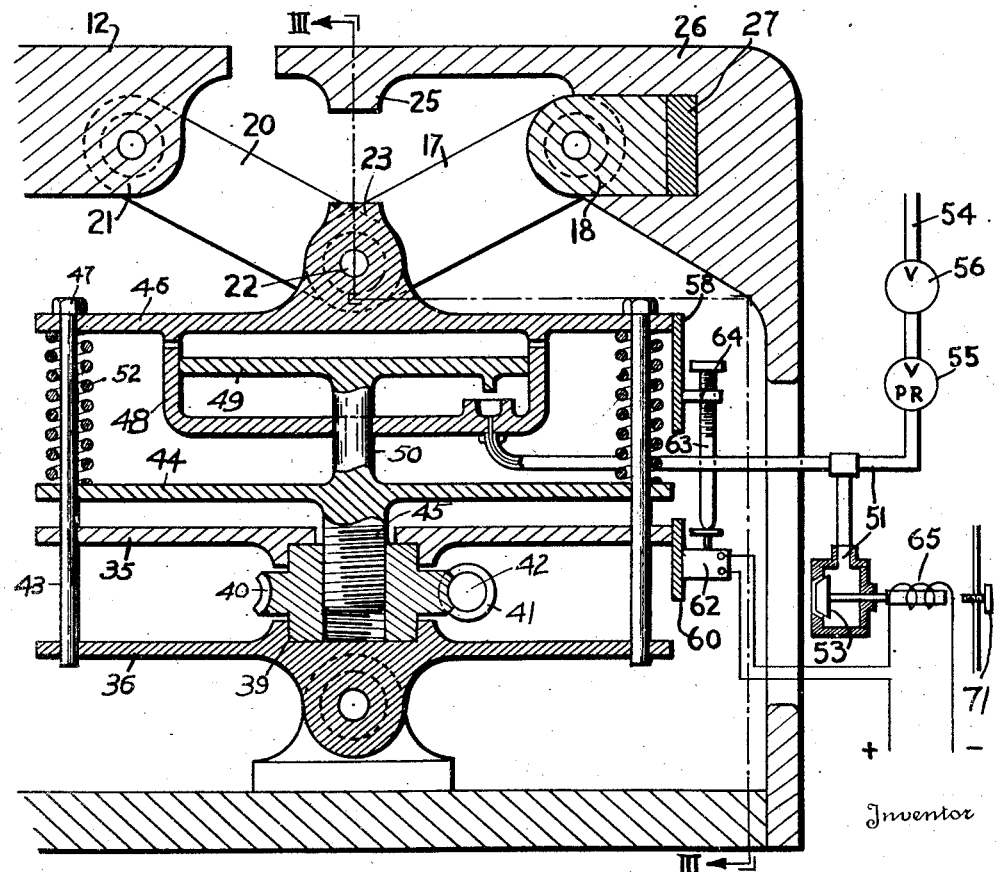
Figure 2 is a partial longtitudinal sectional view of the machine of Figure 1.

In accordance with usual practice, the welding machine illustrated includes a base 10 on which is adjustably mounted a normally stationary platen 11 and a slideable platen 12 which is slideable in suitable guide members 13 attached to the base of the machine. In practice, suitable means, not shown, is provided to insulate the platen 11 from the base 10 and a welding transformer, also not shown, is housed in the base 10 and has its secondary terminals connected to the work piece clamps or dies mounted on the respective platens 11 and 12. Such clamps or dies may each comprise a fixed block 14 and a slideable block 15 mounted for sliding movement on the guide 16. Normally suitable fluid pressure operated devices, not shown, are employed to operate the clamps 15.

Figure 3:
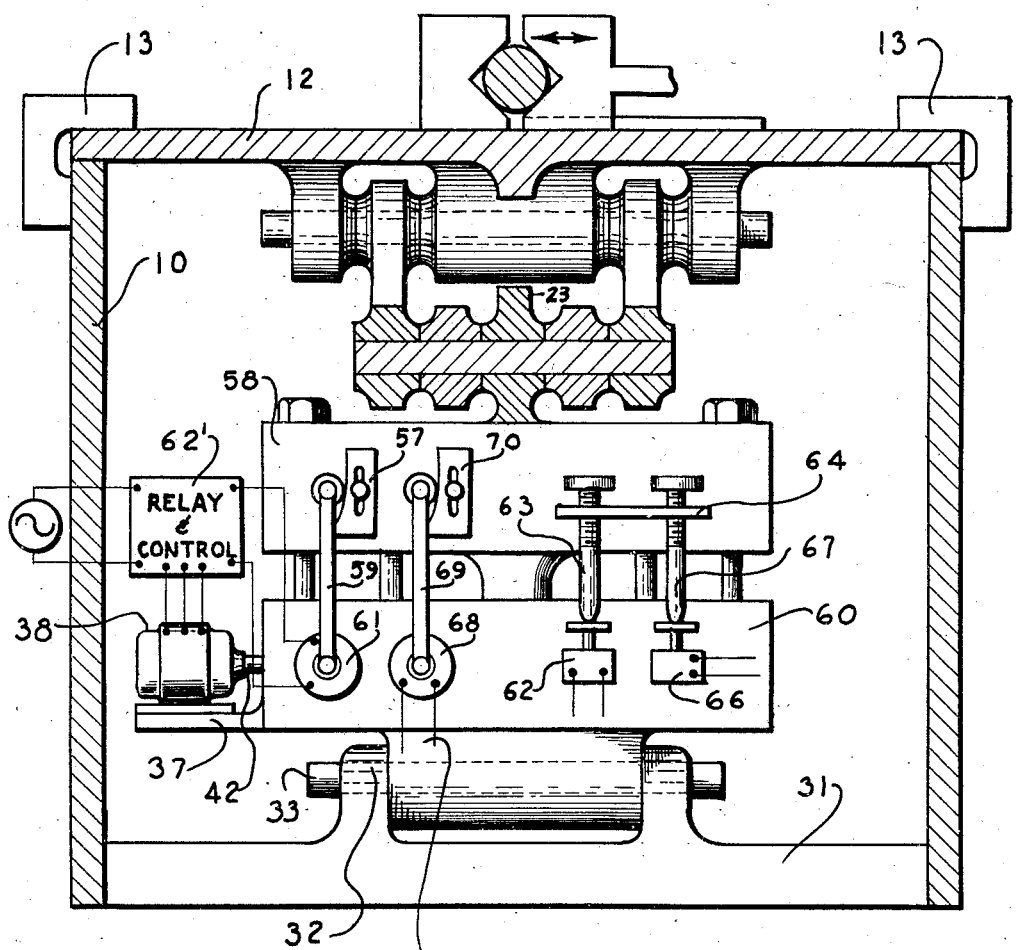
Figure 3 is a transverse sectional view of the machine of Figure 1, the view being taken along the line III—III of Figure 2.

For moving the platen 12 in forward and reverse directions I provide a toggle comprising a pair of links 17 which are pivotally connected to a block 18 slideably mounted in a guideway formed in the base of the machine and a second pair of links 20 pivotally connected to a boss 21 which may be formed integral with the platen 12. Links 17 and 20 are interconnected by a pivot pin 22 and by referring to Figures 1 and 3 it will be noted that the links 17 are laterally spaced to accommodate a pivotal connection with the pin 22 of a link 23. As shown, link 23 extends somewhat above the pin 22 and has a blunt upper end for engagement with a stop 25 depending downwardly from and preferably formed integral with a top plate 26 of the frame 10. Interposed between the slideable block 18 and the rear wall of the frame 10 is a transversely slideable wedge block 27 which is arranged to be moved by a screw connected to an operating handle 29 positioned on the outside of the frame 10. This construction provides ready means to accurately adjust the final position of the platen 12 upon the straightening of the toggle a sufficient amount for the head of the link 23 to engage the stop 25. In this manner a precise adjustment or control over the final die opening of the machine may be had. Block 18 is held in engagement with the wedge 27 by a strong spring, not shown, thereby preventing outward movement of the block 18 upon the collapsing of the toggle in a direction moving the platen 12 in a backward or reverse direction.

A transversely extending strut 31 interconnects the lower portions of the side walls of the frame 10 and is provided on its upper surface with a pair of transversely aligned apertured ears 32 to receive a pivot pin 33. Pin 33 is positioned substantially in vertical alignment with the pin 22. Pivotally mounted on the pin 33 is a housing having outwardly flanged end cap members 35 and 36. Cap member 36 is provided with an extension 37 for mounting an electric motor 38. Journaled in the housing is an internally threaded drive nut 39 on which is mounted and keyed a worm gear 40. Meshing with gear 40 is a worm 41 carried by and keyed to a shaft 42 which is journaled in suitable bearings, not shown, carried by the housing and which is operatively coupled with the drive shaft of the motor 38.

The outwardly directed flanges of the cap members 35 and 36 are provided with aligned apertures to slideably receive a number of circumferentially spaced rods 43. Slideably mounted on the rods 43 above the cap member 35 is a plate 44 to which is rigidly connected a screw 45 having threaded engagement with the drive nut 39. Since the screw 45 is rigidly connected with the plate 44 and the plate 44 is held from turning by the rods 43 it will be apparent that upon rotation of the nut 39 in one direction the plate 44 will be caused to move upwardly while upon rotation of the nut in the opposite direction the plate will move downwardly. Spaced upwardly from the plate 44 is a top plate 46 also provided with apertures in alignment with the apertures in members 44, 35 and 36 for reception of the rods 43 and, as shown, the rods are preferably provided with headed top ends 47 overlying the top surface of the top plate 46. It should be observed that the link 26 is carried by and rigidly connected to the plate 46.

Secured to and depending from the lower face of the plate 46 is a cylinder 48 having a piston 49 therein attached to a rod 50 rigidly connected with the plate 44. The space in cylinder 48 above the piston 49 is open to the atmosphere while the space below the piston is connected with a suitable source of air under regulated pressure by means of the conduit 51. Encircling the rods 43 and interposed between the plates 44 and 46 are coil springs 52 which are under compression thus tending to separate the plates 44 and 46. Upon the introduction into the lower end of cylinder 48 of air under pressure the piston 49 moves upwardly until the total force exerted by the springs 52 approaches and equals the force exerted by the air pressure on the piston 49 after which the plates 44 and 46 will move in unison upon rotation of the nut 39 in either direction. Thus, during normal manipulative movement of the platen 12 and during the flashing movement of the platen, which movements do not require the application of large forces to the link 23, the upper plate 46 and consequently the link 23 will follow the axial movement of the screw 45 rather closely.

To provide for the quick application of the large upsetting force required I provide a valve shown schematically at 53 for rapidly exhausting the air pressure from below the piston 49 thereby releasing the restraint on the springs 52 and allowing these springs to quickly thrust the plate 46 and consequently the link 23 upwardly to further straighten the toggle to effect upsetting movement of the platen 12. It should be observed that at this stage of the welding cycle the toggle is already closely approaching its straightened condition so that there is a substantial modification of the force exerted by the springs 53. Thus, by the use of relatively small and simply constructed parts it is possible to effect sufficient upsetting force for all purposes. The value of this final upsetting force may, of course, be readily varied simply by regulating the pressure of the fluid admitted to cylinder 48 thus varying the compressed condition of the springs 52 at the moment of upset. For accomplishing the herein described mode of operation the valve 53 may be incorporated as an outlet from the conduit 51 although, if desired, the valve and exhausting arrangement as disclosed in the co-pending application of M. A. Seeloff and C. E. Smith, Serial No. 482,630, filed April 10, 1943, now Patent Number 2,363,753, dated November 28, 1944, may be advantageously employed. Conduit 51 is supplied with air under pressure from a suitable source 54 through a pressure regulating device 55. The supply system may also include a metering valve 56 to insure the complete withdrawal of pressure from the cylinder 48 upon actuation of valve 53 as will be understood.

Motor 38 is preferably of the reversing type and it may be controlled in various ways, either manually or automatically or by a combined manual-automatic arrangement, depending on the needs of the particular machines and production schedules. Thus, the rotation and direction of rotation of the motor 38 may be under the direct manual control of the operator through any number of known suitable circuit arrangements, not shown, or under automatic control in response to the instantaneous values of the voltage appearing across the cleft of the work pieces as fully disclosed in my co-pending application Serial No. 520,582 filed February 1, 1944, now Patent Number 2,404,620 dated July 23, 1946. The modulating and directional motor control shown in said patent is directly applicable to the present purposes. By way of example, however, I have schematically shown herein an arrangement whereby the speed of rotation of the motor is varied in accordance with the change in position of the movable platen 12 with respect to the normally fixed platen 11 so that a predetermined time-position pattern of movement of the movable platen 12 may be effected during the flashing period. For this purpose a cam 57 is adjustably mounted on a plate 58 secured to an edge of the plate 46 and cooperating with this cam is a follower 59 anchored to a plate 60 mounted on the side edges of the cap member 35 and 36. Follower 59 is shown as operating an electrical reference condition changing device 61 which operates through a suitable relay and control assembly 62' to control the energization of the motor 38 in the desired manner. Since various control circuits suitable for so controlling the energization of the motor are well-known in the electrical arts and form no part of the present invention, the same will not be included herein. Thus, the control element 61 may be a suitable operative element for effecting a phase shift in a control circuit utilizing alternating current or a potentiometer for effecting other control responses as will be understood. It should be clear that upon relative movements of the plates 58 and 60 and consequently upon movement of the platen 12 the follower 59 will be actuated in accordance with the pattern of the cam 57.

Also mounted on the plate 60 is a normally closed switch 62 adapted to be held in open condition by an operator 63 adjustably carried by a projection 64 of the plate 58. Closure of switch 62 energizes a solenoid 65 which actuates the valve 53. Thus, upon the completion of the flashing period as represented by the platen 12 reaching a predetermined advanced position the operator 63 withdraws sufficiently to close switch 62 thereby exhausting the cylinder 48 to initiate the upsetting movement. Inasmuch as, in certain circumstances, it may be desirable to materially reduce the welding voltage applied during upset I may provide a second switch 66 on the plate 60 which is arranged to be actuated by an operator 67 also adjustably mounted in the projection 64, which switch may be employed to control any of the means now commonly employed to reduce the voltage during upset—such as, for example, the insertion of a reactance in the primary circuit of the welding transformer or the changing of the turns ratio of the welding transformer.

Also mounted on the plate 60 is a second electrical reference condition changing device 68 having an operating lever 69 constituting a follower for a cam 70 adjustably mounted on the plate 58. The control element 68 may be utilized, if desired, in conjunction with suitable known circuits to modulate or vary the welding current as the flashing progresses as is understood in the art. The construction proposed herein has the decided advantage of enabling all the control elements normally associated with flash welders to be grouped together in a readily accessible but protected position in the welder. It is within the contemplation of the present invention that suitable controlling and interlocking circuits will be provided whereby the operator can effect the welding sequence either under full automatic control, full manual control, or by shifting from one to the other as desired.

The speed of travel of the movable platen 12 during its upset movement may be readily controlled by adjustably limiting the extent of opening of the exhaust valve 53. This may be accomplished by providing an adjustable set screw 71 for engaging the valve stem or the solenoid armature connected therewith.

It should now be apparent that I have provided simplified and improved means for obtaining the required movements of a work holding platen in a flash-butt welding machine which accomplishes the objects initially set out. By the use of the invention it is possible to obtain precision of movement of the platen during the flashing period and quick application of a large upsetting force at the completion of the flashing period. Such movement may be either in a forward or reverse direction notwithstanding the employment of a drive which is predominantly mechanical and, further, the construction and arrangement is such as to permit of the employment of widely varying types of controls. The drive disclosed possesses inherent ruggedness and durability since but a minor portion of the elements utilized is subjected to the heavy forces required in the effecting of upsetting movement of the platen. Moreover, the force multiplication arrangement of the invention is utilized to increase the accuracy and sensitivity of various control devices while eliminating, to a great extent, the need for critical adjustment of such devices.

Since various changes may be made in the embodiment of the invention herein specifically described without departing from the spirit or scope of the invention, reference should be made to the appended claims in determining the scope of the invention.

What I claim is:

1. In an electric flash-butt welding machine having a base and a platen slidably mounted thereon, apparatus for effecting sliding movement of said platen comprising a toggle interconnecting said base and platen, power operated moving means, expansible linkage interconnecting said moving means and said toggle whereby said toggle may be operated in a straightening direction, and means to apply an expansible force to said expansible linkage whereby a large moving force may be quickly applied to said platen as the toggle approaches a straightened condition for effecting the upsetting of the work piece held by said platen.

2. In an electric flash-butt welding machine having a base and a platen slideably mounted thereon, apparatus for effecting sliding movement of said platen comprising a toggle interconnecting said base and platen, power operated moving means, linkage means interconnecting said moving means and said toggle comprising a fluid pressure operated force exerting device, and means to control the pressure of the fluid in said device whereby the force exerted by said toggle may be varied.

3. In an electric flash-butt welding machine having a base and a platen slideably mounted thereon, apparatus for effecting sliding movement of said platen during the flashing cycle comprising a power operated moving means, expansible linkage interconnecting said moving means and said platen, said linkage means remaining at substantially constant dimension during the flashing period, and means to expand said linkage whereby said platen may be moved with a quick forward thrust for upsetting a work piece held in said platen.

4. In an electric flash-butt welding machine having a base and a platen slideably mounted thereon, apparatus for effecting sliding movement of said platen during the flashing cycle comprising a power operated moving means, variable length linkage means interconnecting said platen and said moving means and comprising a fluid pressure operated device for varying the effective length of the linkage means, and means for controlling the pressure of the fluid supplied to said device whereby said linkage means may be rapidly increased in length to effect a quick upsetting movement of said platen.

5. In an electric flash-butt welding machine having a base and a platen slideably mounted thereon, apparatus for effecting sliding movement of said platen comprising a screw, a revolvable nut threaded on said screw and journaled for rotation with respect to said base while being restrained against axial movement, a motor for rotating said nut, expansible linkage means interconnecting said screw and said platen, said linkage means being normally of substantially constant dimension during the flashing period of the welding cycle, and means applying an expanding force to said linkage means whereby the same may be quickly lengthened to effect a quick upsetting movement of the platen.

6. In an electric flash-butt welding machine having a base and a platen slideably mounted thereon, apparatus for effecting sliding movement of said platen comprising a screw normally restrained against rotation, a revolvable nut threaded on said screw normally restrained against axial movement, means to rotate said nut, compression spring means between said platen and said screw, fluid pressure operated means applying an initial and substantially constant compression force to said spring means whereby during flashing said platen follows substantially the axial movement of said screw, and means to withdraw the fluid pressure from said fluid pressure operated means whereby the energy stored in the compressed spring means is released for effecting a quick upsetting movement of said platen.

7. Apparatus according to claim 6 further including a toggle for operating said platen, said spring means being connected to said toggle, the arrangement being such that said fluid pressure may be withdrawn as said toggle approaches the straightened condition whereby the expansible force exerted by said spring means is substantially multiplied in its translation to the platen.

8. In an electric flash-butt welder having a base and a platen slideably mounted thereon; a driving mechanism for said platen comprising a toggle having one of its ends pivotally connected to said platen and its other end pivotally connected to said base, a driving member engaging said toggle for operating the same, a second member spaced from said driving member, compression spring means interposed between said members, fluid pressure operated means interconnecting said members and operative to draw said members toward each other thus compressing said spring means and storing energy therein, power operated means to move said second member in toggle operating directions, and means to change rapidly the pressure of the fluid in said fluid operated means whereby the energy in said spring means may be released for further operation of said toggle.

9. Apparatus according to claim 8 further characterized in that said toggle comprises links and a pin pivotally interconnecting the same, said power operated means being pivotally connected to said base for rocking movement about an axis substantially parallel with the axis of said pin, said driving member having pivotal connection with said pin, and means maintaining the alignment of said power means and members intermediate said axes.

10. In an electric flash-butt welder having a slideable platen; a driving mechanism for said platen comprising a motor driven moving means, compression spring means interposed between said platen and moving means, fluid pressure operated means interconnecting said platen and said moving means and operative to maintain said spring means under predetermined compression, and means to effect change in pressure of the fluid in said fluid pressure operated means at a predetermined rate whereby the energy stored in said spring means may be released for the advancement of said platen at a predetermined rate.

JOSEPH H. COOPER.

REFERENCES CITED

The following references are of record in the file of this patent:

UNITED STATES PATENTS

| Number | Name | Date |
| --- | --- | --- |
| 1,459,885 | Hadley | June 26, 1923 |
| 1,676,282 | Phelps | July 10, 1928 |
| 1,892,208 | Ferris | Dec. 27, 1832 |
| 2,258,093 | Gastrow | Oct. 7, 1941 |